(12) United States Patent
Akaguma

(10) Patent No.: US 12,495,208 B2
(45) Date of Patent: Dec. 9, 2025

(54) DETECTING APPARATUS, IMAGE PICKUP APPARATUS, AND DETECTING METHOD

(71) Applicant: CANON KABUSHIKI KAISHA, Tokyo (JP)

(72) Inventor: Takayuki Akaguma, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 221 days.

(21) Appl. No.: 18/526,741

(22) Filed: Dec. 1, 2023

(65) Prior Publication Data
US 2024/0196089 A1 Jun. 13, 2024

(30) Foreign Application Priority Data

Dec. 13, 2022 (JP) ................. 2022-198762

(51) Int. Cl.
H04N 23/67 (2023.01)
H04N 23/73 (2023.01)
(52) U.S. Cl.
CPC ............. *H04N 23/67* (2023.01); *H04N 23/73* (2023.01)

(58) Field of Classification Search
CPC ...... H04N 23/67; H04N 23/73; H04N 23/672; H04N 23/745; H04N 23/675
See application file for complete search history.

(56) References Cited

FOREIGN PATENT DOCUMENTS

JP 2010-263568 A 11/2010

*Primary Examiner* — Gevell V Selby
(74) *Attorney, Agent, or Firm* — Cowan, Liebowitz & Latman, P.C,

(57) ABSTRACT

A detecting apparatus performs focus detection using a pair of focus detecting signals obtained from an image sensor, detects flicker using a flicker detecting signal obtained from the image sensor, and controls signal readout from the image sensor. The detecting apparatus switches between a first readout state for performing signal readout for generating the pair of focus detecting signals from each of the first pixel and the second pixel, and a second readout state for performing signal readout for generating the pair of focus detecting signals from a focus detecting pixel as the first pixel and for performing signal readout for generating the flicker detecting signal from a flicker detecting pixel that is either the first pixel or the second pixel and is different from the focus detecting pixel.

12 Claims, 10 Drawing Sheets

PLANE VIEW a-a SECTIONAL VIEW

DETECTING APPARATUS, IMAGE PICKUP APPARATUS, AND DETECTING METHOD

BACKGROUND

Technical Field

One of the aspects of the embodiments relates to focus detection and flicker detection in an image pickup apparatus.

Description of Related Art

Image pickup apparatuses such as digital cameras and video cameras have a function that detects flicker contained in ambient light and performs exposure control suitable for noise reduction to prevent stripes and unevenness caused by the flicker from being imaged as noises. In order to detect the flicker, the signal readout is performed from an image sensor at a frame rate corresponding to a flicker cycle, which is different from the normal frame rate. A laminated sensor is known as one type of image sensor, which can perform signal readout for detecting the flicker in parallel with signal readout for generating an image for live-view display.

Some image pickup apparatuses that perform focus detection of the imaging-surface phase-difference detecting method perform not only phase difference detection in the horizontal direction of the image sensor but also phase difference detection in the vertical direction of the image sensor. Japanese Patent Laid-Open No. 2010-263568 discloses an image pickup apparatus that performs phase difference detection only in the horizontal direction in a case where flicker may affect phase difference detection in the vertical direction and degrade focus detection performance.

However, in the image pickup apparatus disclosed in Japanese Patent Laid-Open No. 2010-263568, the influence of flicker on the focus detection remains in an environment where flicker dynamically changes.

Moreover, in performing phase difference detection in the vertical direction, if the flicker detecting signal is thinned out from the signal for the live-view display, the phase difference detection accuracy in the vertical direction (that is, focus detection accuracy) decreases.

SUMMARY

A detecting apparatus according to one aspect of the embodiment includes a memory storing instructions, and a processor configured to execute the instructions to perform focus detection using a pair of focus detecting signals obtained from an image sensor that has a first pixel including a pair of photoelectric converters arranged in a first direction and a second pixel including a pair of photoelectric converters arranged in a second direction different from the first direction, detect flicker using a flicker detecting signal obtained from the image sensor, and control signal readout from the image sensor. The processor is configured to switch between a first readout state for performing signal readout for generating the pair of focus detecting signals from each of the first pixel and the second pixel, and a second readout state for performing signal readout for generating the pair of focus detecting signals from a focus detecting pixel as the first pixel and for performing signal readout for generating the flicker detecting signal from a flicker detecting pixel that is either the first pixel or the second pixel and is different from the focus detecting pixel. An image pickup apparatus having the above detecting apparatus also constitutes another aspect of the embodiment. A detecting method corresponding to the detecting apparatus also constitutes another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
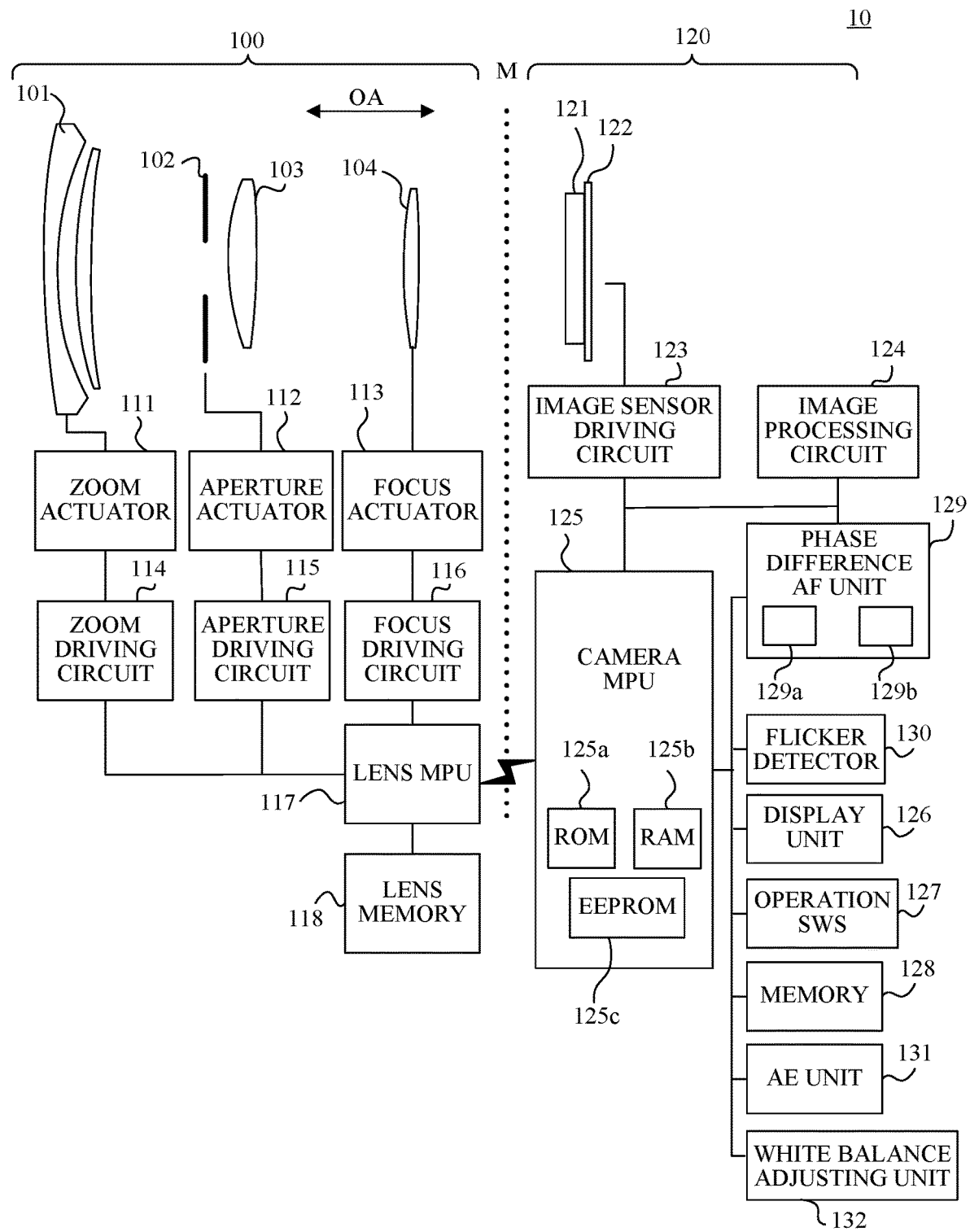
FIG. 1 is a block diagram illustrating the configuration of a camera system including an image pickup apparatus according to this embodiment.

FIG. 1 illustrates the configuration of an imaging system 10 including an image pickup apparatus according to this embodiment. The imaging system 10 includes a lens unit 100 as an interchangeable lens and a camera body 120 as an image pickup apparatus. The lens unit 100 is attached to and detached from the camera body 120 via a mount M illustrated by a dotted line in FIG. 1. The camera body 120 is a mirrorless digital camera. The image pickup apparatus may be a single-lens reflex digital camera, a video camera, or a lens-integrated camera.

The lens unit 100 includes an imaging optical system including a first lens unit 101, an aperture stop 102, a second lens unit 103, and a focus lens unit (simply referred to as "focus lens" hereinafter) 104, and a lens driving/controlling system.

The first lens unit 101 is disposed closest to the object (foremost) in the imaging optical system, and is movable in the optical axis direction OA. The aperture stop 102 adjusts a light amount by changing its aperture diameter, and functions as a shutter that controls the exposure time in capturing a still image. The aperture stop 102 and the second lens unit 103 are movable together in the optical axis direction OA, and achieve a zoom function in association with the movement of the first lens unit 101. The focus lens 104 moves in the optical axis direction OA during focusing. Autofocus (AF: focus control) is provided by controlling the position of the focus lens 104 in the optical axis direction OA based on a phase difference obtained by a phase-difference AF unit 129, which will be described below.

The lens driving/controlling system includes a zoom actuator 111, an aperture actuator 112, a focus actuator 113, a zoom driving circuit 114, an aperture driving circuit 115, a focus driving circuit 116, a lens MPU 117, and a lens memory 118. During zooming, the zoom driving circuit 114 moves the first lens unit 101 and the second lens unit 103 in the optical axis direction OA by driving the zoom actuator 111. The aperture driving circuit 115 drives the aperture actuator 112 to change the aperture diameter of the aperture stop 102 or perform a shutter operation. During AF, the focus driving circuit 116 moves the focus lens 104 in the optical axis direction OA by driving the focus actuator 113. The focus driving circuit 116 has a function of detecting the position of the focus lens 104 (focus position).

The lens MPU 117 performs calculations and processing relating to the lens unit 100, and also controls the zoom driving circuit 114, the aperture driving circuit 115, and the focus driving circuit 116 according to a request from the camera MPU 125. The lens MPU 117 communicates commands and data with the camera MPU 125 through the mount M. For example, the lens MPU 117 transmits focus position information to the camera MPU 125 according to a request from the camera MPU 125. This focus position information includes information about the position of the focus lens 104 in the optical axis direction OA, the position and diameter of the exit pupil of the imaging optical system in the optical axis direction OA, and the position and diameter in the optical axis direction OA of the lens frame that limits the light beam of the exit pupil. The lens memory 118 stores optical information necessary for AF. The camera MPU 125 executes the above calculations and processing according to the programs stored in the built-in nonvolatile memory and the lens memory 118.

The camera body 120 includes an optical low-pass filter 121, an image sensor 122, and a camera driving/controlling system. The optical low-pass filter 121 attenuates high-frequency components of light from the imaging optical system to reduce false colors and moiré.

The image sensor 122 includes a processing circuit and a CMOS sensor in which m pixels in the horizontal direction (the long side direction) and n pixels in the vertical direction (the short side direction) (where m and n are integers of 2 or more) are two-dimensionally arranged. The image sensor 122 photoelectrically converts an object image as an optical image formed by light from the imaging optical system (light that has passed through the optical low-pass filter 121) and outputs a signal. The processing circuit combines signals read from all pixels and generates an imaging signal. The image sensor 122 photoelectrically converts two optical images formed by light beams that have passed through different pupil areas of the exit pupil of the imaging optical system, and outputs a pair of signals. The processing circuit combines a pair of signals read from at least part of all the pixels and outputs a pair of focus detecting signals.

The camera driving/controlling system includes an image-sensor driving circuit 123, an image processing circuit 124, a camera MPU 125, a display unit 126, operation switches (SWs) 127, a memory 128, a phase-difference AF unit 129, a flicker detector 130, an auto-exposure (AE) unit 131, and a white balance adjusting unit 132. The phase-difference AF unit 129, flicker detector 130, and camera MPU 125 constitute a detecting apparatus and a focusing apparatus.

The image-sensor driving circuit 123 controls charge accumulation and signal readout of the image sensor 122, A/D-converts the focus detecting signal paired with the imaging signal, which is an analog signal read out of the image sensor 122, and outputs it to the camera MPU 125. The image processing circuit 124 performs predetermined processing (gamma conversion, color interpolation processing, compression encoding processing, etc.) for the A/D-converted imaging signal and generates image data for display and recording. The image processing circuit 124 also generates signals for AE, white balance adjustment, and flicker detection from the imaging signal.

The camera MPU 125 as a control unit includes a microcomputer and performs calculations and processing regarding the camera body 120. At this time, the camera MPU 125 controls the image-sensor driving circuit 123, image processing circuit 124, display unit 126, operation SWs 127, memory 128, phase-difference AF unit 129, flicker detector 130, AE unit 131, and white balance adjusting unit 132. The camera MPU 125 communicates commands and data with the lens MPU 117 via signal lines provided on the mount M. For example, the camera MPU 125 transmits a focus position and focus driving request to the lens MPU 117, and receives optical information specific to the lens unit 100 from the lens MPU 117.

The camera MPU 125 includes a ROM 125a that stores programs for executing the above calculations and processing, a RAM 125b that stores various variables, and an EEPROM 125c that stores various parameters.

The display unit 126 includes a display element such as an LCD, and displays information about an imaging mode of the camera body 120, a preview image before imaging (an image for live-view display), a confirmation image after imaging, an image illustrating the in-focus state, etc. The operation SWs 127 include a power SW, an imaging preparation SW, a release (imaging trigger) SW, a zoom operation SW, an imaging mode selecting SW, and the like. The memory 128 is a flash memory that is attached to and detached from the camera body 120, and records captured images.

The phase-difference AF unit (focus detector) 129 includes an acquiring unit 129a that acquires a pair of focus detecting signals via the camera MPU 125, and a calculator 129b that performs a correlation calculation for the pair of focus detecting signals to calculate a phase difference between the pair of focus detecting signals. Moreover, the calculator 129b calculates a defocus amount of the imaging optical system as a focus detection result from the phase difference, and calculates a driving amount of the focus lens 104 (referred to as a focus driving amount hereinafter) according to the defocus amount.

In a case where the camera MPU 125 transmits a focus command including the focus driving amount from the phase-difference AF unit 129 to the lens MPU 117, the lens MPU 117 drives the focus driving circuit 116 based on the focus driving amount. Thereby, the focus lens 104 is moved to a position that provides an in-focus state. In this way, AF using the imaging-surface phase-difference detecting method (imaging-surface phase-difference AF) is performed. The phase-difference AF unit 129 may be provided within the camera MPU 125.

The flicker detector 130 detects flicker using a signal for flicker detection (flicker detecting signal) obtained from the image processing circuit 124. The camera MPU 125 performs proper exposure control that does not cause flicker based on the flicker detection result. Details of the flicker detector 130 will be described below.

The AE unit 131 performs photometry (light metering) based on the AE signal obtained from the image processing circuit 124 and sets an aperture value (F-number), shutter speed, and ISO speed to obtain a proper exposure amount. The white balance adjusting unit 132 performs white balance adjusting processing using a white balance adjusting signal obtained from the image processing circuit 124. More specifically, white balance is calculated from a white balance adjusting signal, and color weights are adjusted based on a difference between the calculated white balance and a predetermined target white balance.

Figure 2:
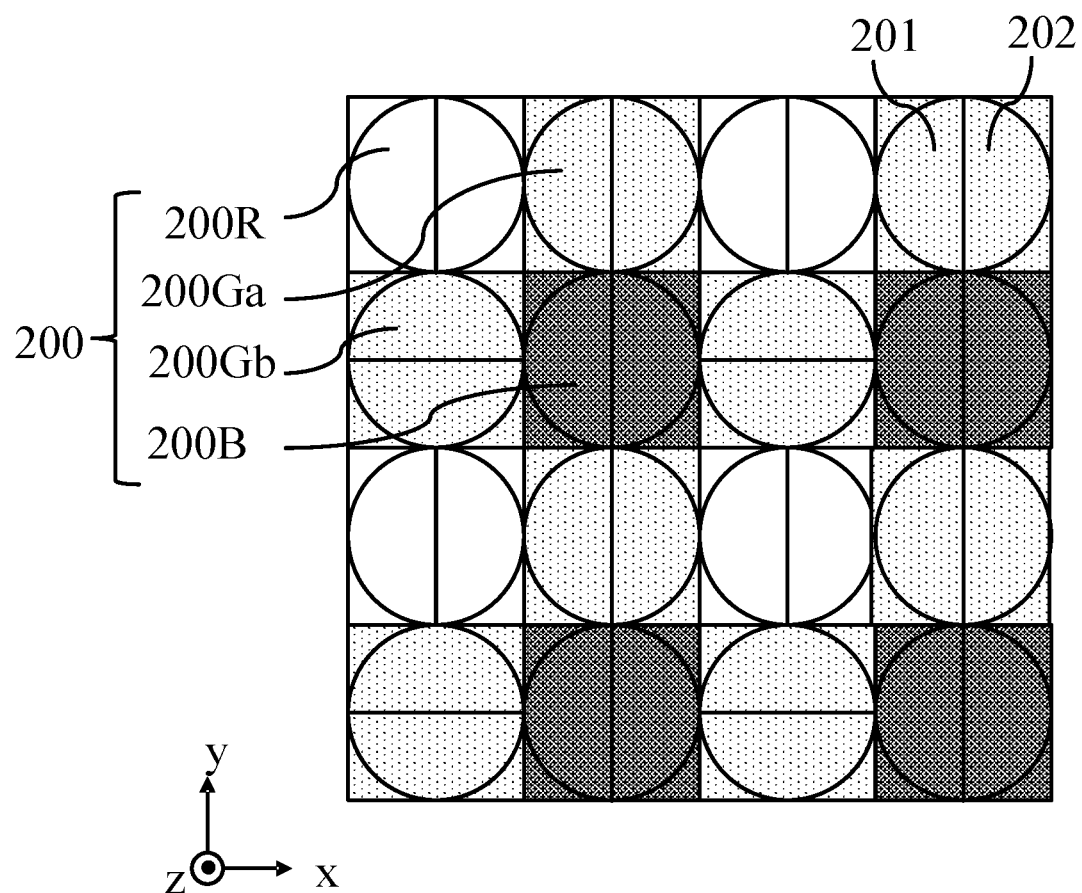
FIG. 2 illustrates a pixel array of the image sensor in the embodiment.

FIG. 2 illustrates a pixel array on the image sensor 122 in a range of 4 pixels (column)×4 pixels (row). In a pixel group 200 of 2 pixels (column)×2 pixels (row), a pixel 200R with a spectral sensitivity of R (red) is located at the upper left, pixels 200Ga and 200Gb with a spectral sensitivity of G (green) are located at the upper right and lower left, and a pixel 200B with a spectral sensitivity of B (blue) is located at in the lower right. Each pixel includes a first sub-pixel 201 and a second sub-pixel 202, which are a pair of focus detecting pixels. The first and second sub-pixels 201 are arranged (divided) in the row direction, which is the horizontal direction, in the pixels 200R, 200Ga, and 200B, and arranged in the column direction, which is the vertical direction, in the pixel 200Gb.

Figure 3A:
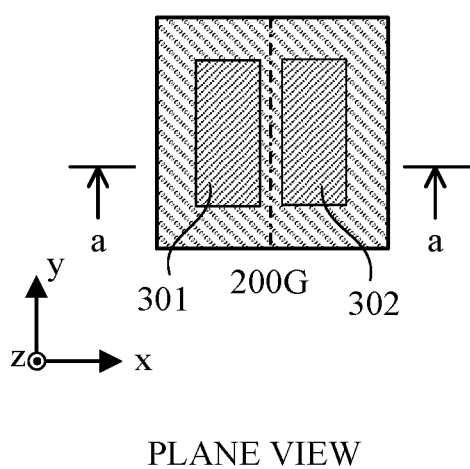
FIGS. 3A and 3B are a plan view and a sectional view of a pixel in the embodiment.
Figure 3B:
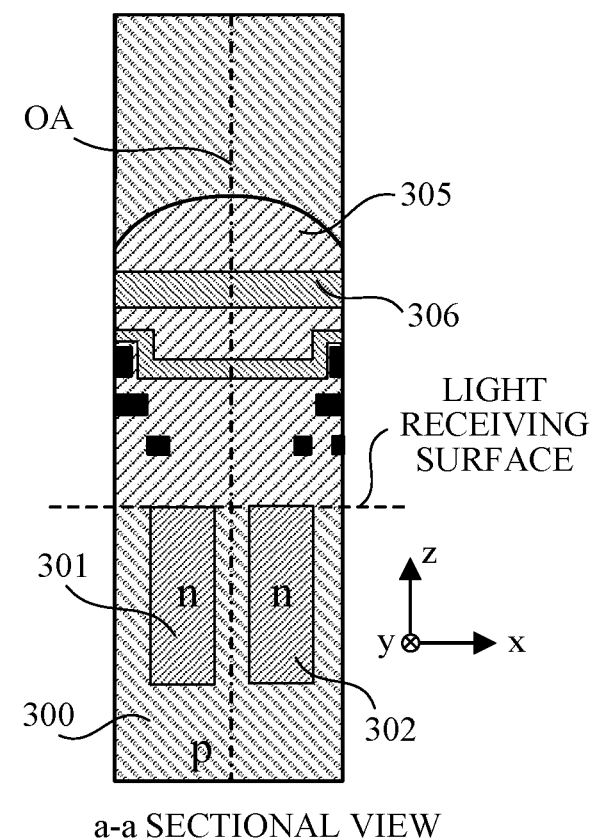

FIG. 3A illustrates a single pixel 200Ga viewed from the light-receiving surface side (+z side) of the image sensor 122, and FIG. 3B illustrates a section along the a-a line in FIG. 3A viewed from the -y side. The pixel 200Ga has one microlens 305 and a pair of photoelectric converters 301 and 302 corresponding to the first and second sub-pixels 201 and 202. Each photoelectric converter may be a pin structure photodiode in which an intrinsic layer is sandwiched between a p-type layer and an n-type layer, or may be a pn-junction photodiode in which the intrinsic layer is omitted.

A color filter 306 is disposed between the microlens 305 and the photoelectric converters 301 and 302 in the pixel 200Ga. The spectral transmittance of the color filter 306 may be different for each photoelectric converter, or the color filter 306 may be omitted.

The light incident on the pixel 200Ga is collected by the microlens 305, separated by the color filter 306, and then received by the photoelectric converters 301 and 302. In each photoelectric converter, electrons and holes are generated as pairs depending on the received light amount. After these are separated by a depletion layer, negatively charged electrons are accumulated in the n-type layer, and holes are discharged to the outside of the image sensor 122 through the p-type layer by a constant voltage source (not illustrated). Electrons accumulated in the n-type layer of each photoelectric converter are transferred to a capacitor (FD) via a transfer gate and converted into a voltage signal.

Figure 4:
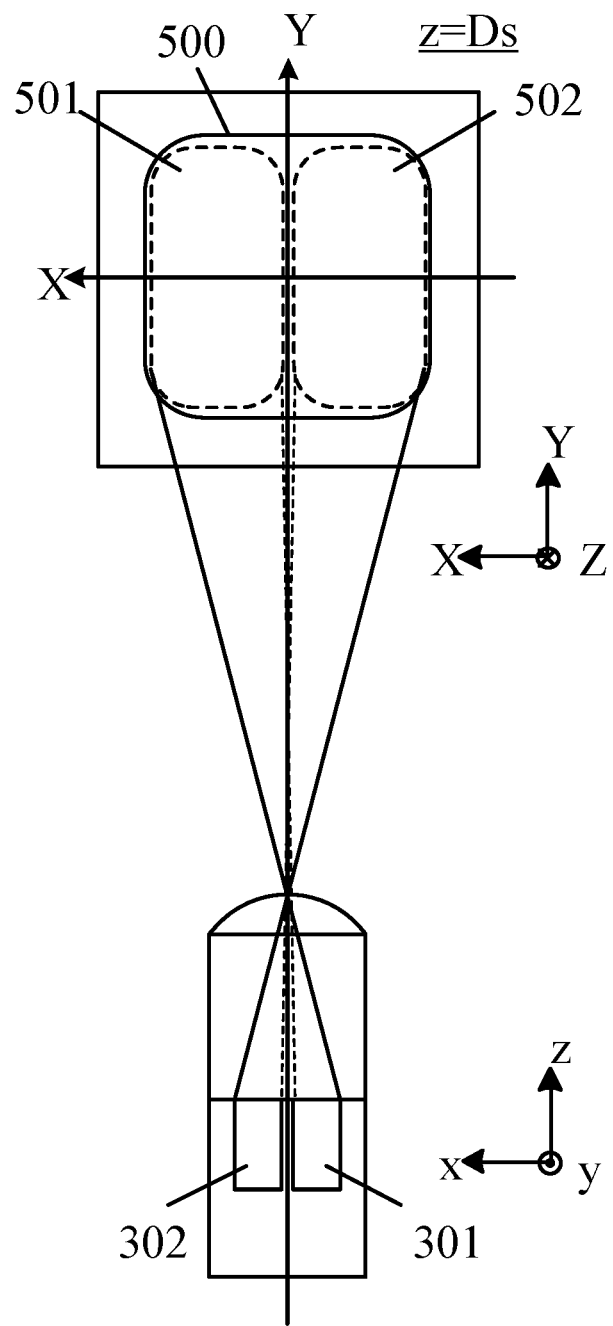
FIG. 4 explains pupil division in the embodiment.

FIG. 4 illustrates a relationship between an exit pupil 500 of the imaging optical system and the photoelectric converters 301 and 302 of the pixel (first pixel) 200Ga. FIG. 4 illustrates a section taken along line a-a and the exit pupil 500 viewed from the +y side in FIG. 3A. DS is a pupil distance between the exit pupil 500 and image sensor 122. In FIG. 4, the x-axis and y-axis are inverted to FIG. 3A for correspondence with the coordinate axes of the exit pupil.

A first pupil area 501 whose center of gravity is decentered in the +X direction within the exit pupil 500 is in an approximately conjugate relationship with the photoelectric converter 301 whose center of gravity is decentered in the -x direction by the microlens 305. A second pupil area 502 whose center of gravity is decentered in the -X direction within the exit pupil 500 is in an approximately conjugate relationship with the photoelectric converter 302 whose center of gravity is decentered in the +x direction due to the microlens 305. The exit pupil 500 is an area through which the light beam passes that can be received by the entire pixel 200Ga including the photoelectric converters 301 and 302. Thus, the pixel 200Ga performs pupil division in the row direction utilizing the microlens 305.

Although not illustrated, in the pixel (second pixel) 200Gb, a third pupil area whose center of gravity is decentered in the +Y direction within the exit pupil is in an approximately conjugate relationship with the photoelectric converter whose center of gravity is decentered in the -y direction by the microlens. A fourth pupil area whose center of gravity is decentered in the -Y direction within the exit pupil is in an approximately conjugate relationship with the photoelectric converter whose center of gravity is decentered in the ty direction by the microlens. The 200Gb pixels perform pupil division in the column direction using the microlens 305.

Each pixel of the image sensor may include four photoelectric converters, two of which are arranged in each of the row and column directions, and pupil division may be performed in each of the row and column directions. That is, the first pixel and the second pixel may be the same pixel.

Figure 5:
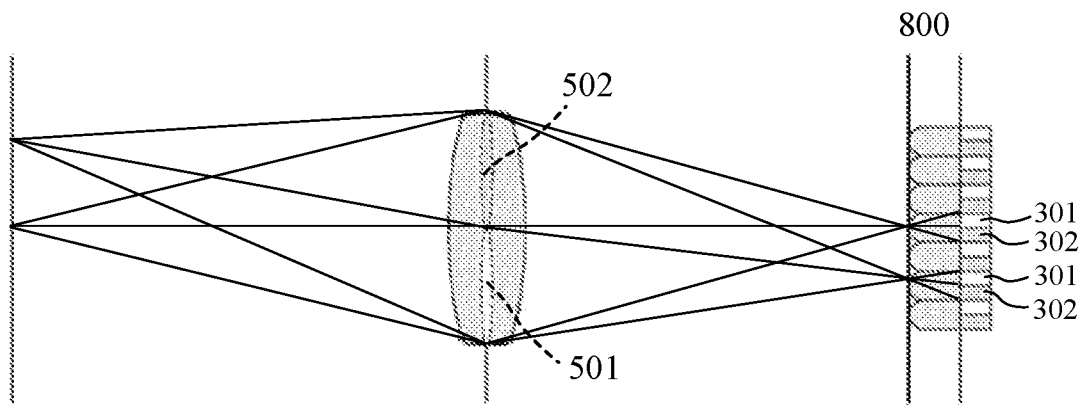
FIG. 5 illustrates a relationship between the image sensor and pupil division in the embodiment.

FIG. 5 illustrates a light beam incident on each pixel of the image sensor 122 with the pupil division. The light beams that have passed through each of the first pupil area 501 and the second pupil area 502 are incident at different angles for each pixel and are received by the photoelectric converters 301 and 302.

In this embodiment, signals read out of the first sub-pixels 201 of a plurality of pixels included in the focus detecting area on the image sensor 122 are combined to generate a first focus detecting signal of the pair of focus detecting signals. Signals read out of the second sub-pixels 202 of a plurality of pixels are combined to generate a second focus detecting signal of the pair of focus detecting signals. An image signal is generated by combining the added signals obtained by adding the signals read from the first and second sub-pixels 201 and 202 of each pixel on the image sensor 122 over all pixels. One focus detecting signal may be subtracted from the imaging signal to generate the other focus detecting signal.

In the image sensor, all pixels may be divided into first and second sub-pixels as in this embodiment, but the focus detecting pixels including the first and second sub-pixels may be provided separately from the imaging pixels each including a single photoelectric converter.

Figure 6:
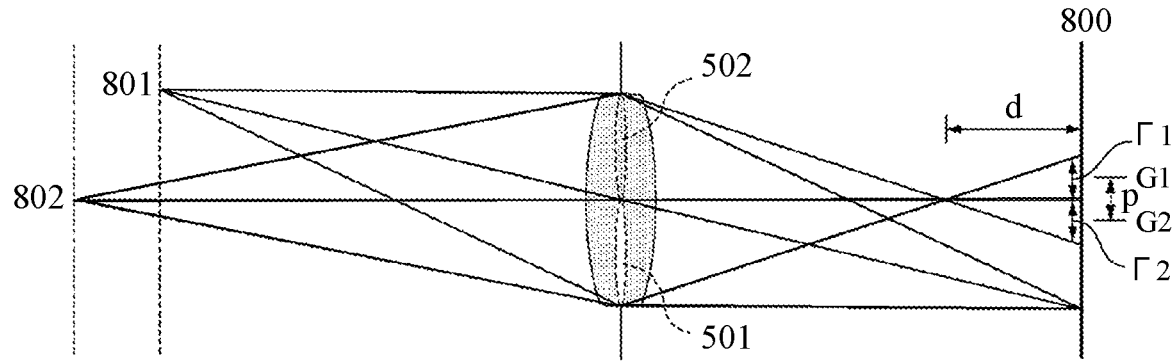
FIG. 6 illustrates a relationship between a phase difference of a pair of focus detecting signals and a defocus amount in the embodiment.

FIG. 6 illustrates a relationship between a phase difference between the pair of focus detecting signals and a defocus amount. In a case where a magnitude |d| of a defocus amount d is a distance from the imaging position of the object image to an imaging surface 800 of the image sensor, a front focus state in which the imaging position is located closer to the object than the imaging surface 800 is indicated by a negative sign (d<0). A rear focus state in which the imaging position is located on a side opposite to the object of the imaging surface 800 is indicated by a positive sign (d>0). In an in-focus state where the imaging position of the object image is located on the imaging surface 800, d=0. FIG. 6 illustrates the position of an object 801 in an in-focus state and the position of an object 802 in a front focus state. In the following description, a front focus state and a rear focus state are collectively referred to as a defocus state (|d|>0).

In the front focus state (d<0) among the light beams from the object 802, the light beams that have passed through the first pupil area 501 (or the second pupil area 502: the same applies hereinafter) are once condensed, and then the centers of gravity of the light beams spread to a width Γ1 (Γ2) with G1 (G2) as the center and become a blurred image on the imaging surface 800. The blurred image is received by the first sub-pixel 201 (second sub-pixel 202) of each pixel arranged on the imaging surface 800, and a first focus detecting signal (second focus detecting signal) is generated. Thus, the first focus detecting signal (second focus detecting signal) becomes a signal obtained by photoelectrically converting an object image in which the object 802 is blurred to the width Γ1 (Γ2) at the center of gravity position G1 (G2) on the imaging surface 800. The blur width Γ1 (Γ2) of the object image approximately proportionally increases as the magnitude |d| of the defocus amount d increases. Similarly, a magnitude |p| of a phase difference p (=difference G1-G2 between the center-of-gravity positions of the light beams), which is a shift amount between the first and second focus detecting signals, is also approximately proportionally increases as the magnitude |d| of the defocus amount d increases. This is similarly applied to the rear focus state (d>0), although the shift direction between the first and second focus detecting signals is opposite to that of the front focus state.

The phase-difference AF unit 129 converts a phase difference into a defocus amount using a conversion coefficient calculated from a distance (base length) between the first and second sub-pixels 201 and 202 based on a relationship in which the phase difference between the first and second focus detecting signals increases as the defocus amount increases.

In the following description, defocus amount calculation using the first and second focus detecting signals obtained from a pixel that performs pupil division in the horizontal direction, such as the pixel 200Ga, will be referred to as horizontal defocus calculation. Defocus amount calculation using first and second focus detecting signals obtained from a pixel that performs pupil division in the vertical direction, such as the 200 Gb pixel, will be referred to as vertical defocus calculation.

Figure 7:
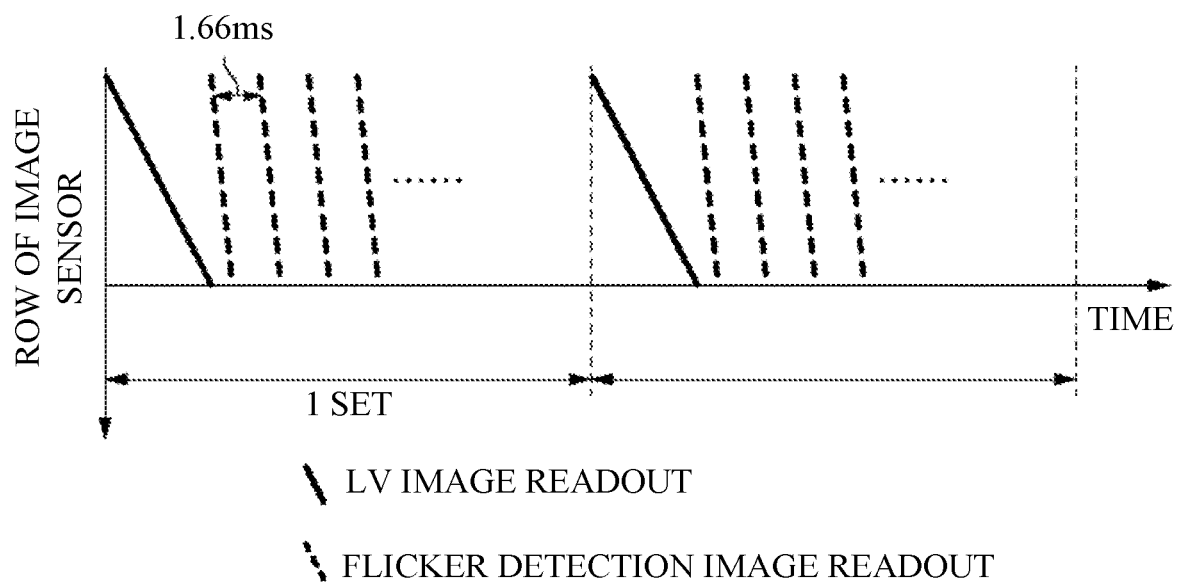
FIG. 7 illustrates the driving of the image sensor in the embodiment.

A description will now be given of flicker detection by the flicker detector 130. FIG. 7 illustrates the driving of the image sensor 122 in a mode for capturing an image for live-view display (referred to as an LV image hereinafter). The horizontal axis represents time, and the vertical axis represents the position (row) of the image sensor 122 in the vertical direction. A solid diagonal line indicates the timing of signal readout from the image sensor 122 (referred to as LV signal readout hereinafter) for generating one (one frame) LV image. A dashed diagonal line indicates the timing of signal readout from the image sensor 122 (referred to as flicker detecting signal readout hereinafter) for generating a flicker detecting image, which is a flicker detecting image as a single image.

In flicker detecting signal readout, in the image sensor 122, signals are read out from rows including pixels 200Gb for which pupil division is performed in the column direction (a row including first and second pixels that are flicker detecting pixels) among a plurality of rows each including a plurality of pixels. At this time, focus detection (horizontal defocus calculation) is performed using a pair of focus detecting signals generated by signal readout from the remaining rows (rows including only the first pixels as the focus detecting pixels (that include the first pixels and do not include second pixels)) after the rows including the pixel 200Gb is thinned out. The image sensor 122 according to this embodiment can independently control the accumulation in thinned-out rows for flicker detecting signal readout and other rows for LV (focus detection) signal readout, and can perform the flicker detecting signal readout while the LV signal readout is performed.

As illustrated in FIG. 7, the LV signal readout is first performed once, and then the flicker detecting signal readout is performed a plurality of times. This embodiment repeats one set of signal readouts (referred to as set readout hereinafter) including the LV signal readout once and the flicker detecting signal readout a plurality of times at a predetermined cycle.

This embodiment sets the time interval of the flicker detecting signal readout to 1.66 ms. Generally, the flicker frequency is 100 Hz or 120 Hz, which is twice as long as the frequency of the commercial power supply supplied to the light source, 50 Hz or 60 Hz. By determining the temporal change in luminance by setting the flicker detecting signal readout time interval to 1.66 ms, the presence or absence of flicker and the peak of the light source can be detected at any one of 100 Hz and 120 Hz.

In a case where the frame rate for live-view display is 1/T [fps], the set readout is repeated at a cycle of T [ms] (predetermined cycle). Assume that the time required for the LV signal readout once and the time required for the flicker detecting signal readout once are each constant. In this case, how many flicker detecting images can be generated in each set readout depends on the cycle T [ms] of the set readout. Therefore, as the cycle T [ms] of the set readout becomes longer, the number of flicker detecting images increases that can be generated in the remaining time after the LV signal readout is performed in the single cycle.

Figure 8A:
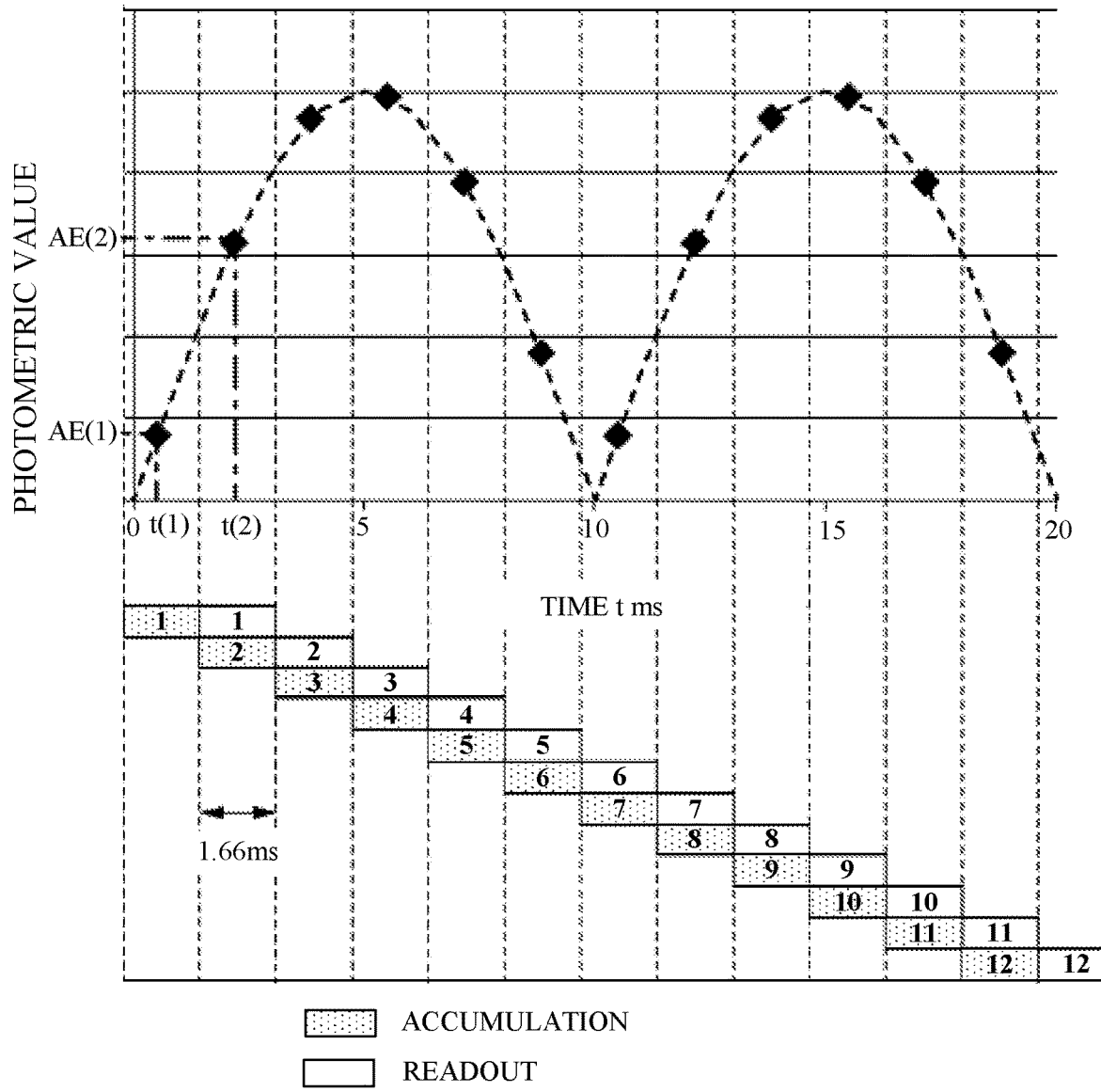
FIGS. 8A and 8B illustrate accumulation control of the image sensor and changes in photometric values in a flicker environment in the embodiment.

FIG. 8A illustrates accumulation control of the image sensor 122 and changes in a photometric value in an environment where flicker at 100 Hz (or 100 Hz flicker) occurs in a 50 Hz commercial power supply. Basically, flicker is determined by acquiring the photometric values of the flicker detecting images for two cycles of the flicker to be detected, and then by calculating a correlation between the photometric value for one cycle of the first half and the photometric value for one cycle of the second half. That is, the photometric values for two cycles of 20 ms are used to determine flicker at 100 Hz, and the photometric values for two cycles of 16.6 ms are used to determine flicker at 120 Hz (120 Hz flicker). In order to detect flickers at both of the frequencies of 100 Hz and 120 Hz, this embodiment uses the photometric values for a longer period of 20 ms (that is, a time that is twice or more as long as the cycle of the flicker to be detected). Since flicker detecting images are generated at a cycle of 1.66 ms, flicker can be determined by using 12 consecutive flicker detecting images for 20 ms.

In a case where the frame rate for live-view display is 30 fps, the remaining time required for the LV signal readout is twice or more as long as the cycle of flicker at 100 Hz, and each set readout can generate 18 flicker detecting images. This embodiment uses only the first to twelfth images among these 18 flicker detecting images. FIG. 8A illustrates photometric values obtained from these 12 flicker detecting images.

In FIG. 8A, nth accumulation will be referred to as "accumulation n," and the signal readout obtained by the accumulation n will be referred to as "readout n." The nth photometric value obtained from the result of readout n (nth flicker detecting image) will be referred to as "AE(n)." This embodiment acquires photometric values AE(1) to AE(12) using the first to twelfth flicker detecting images. Since accumulation is performed in a finite time, the acquiring timing of each photometric value is represented by a median value during the accumulation period. The acquiring timings of the photometric values AE(1) to AE(12) will be referred to as t(1) to t(12), respectively.

The flicker detector 130 determines flicker at 100 Hz using the photometric values AE(1) to AE(12). More specifically, the evaluation value for the flicker determination is defined by the following equation (1):

$$SAD(m)=\Sigma_{i=1}^{6}|AE(n)-AE(n+m)| \quad (1)$$

In equation (1), Sum of Absolute Difference (SAD) is an index representing similarity that is used in the field of pattern matching. m represents a value that indicates how previous photometric value is to be calculated for the similarity to the nth photometric value AE (n) among the photometric values calculated for the 12 images. SAD(m) represents the calculation of the similarity between the nth photometric value and a photometric value after (1.66×m) ms has elapsed. As can be understood from equation (1), the higher the similarity is, the smaller the value of SAD(m) is.

For example, in an environment where flicker at 100 Hz occurs, the flicker period is about 10 ms. Since 10 ms is approximately 6 times (10≥1.66≈6) as long as the accumulation time of 1.66 ms for generating a flicker detecting image, as illustrated in FIG. 8A, regardless of the accumulation timing, a similar photometric value is obtained at a cycle of six times. That is, a relationship of AE(n)≈AE(n+6) is established. From this relationship, in a case where SAD(6) is calculated in an environment of the flicker at 100 Hz, SAD(6) becomes approximately 0. Thus, as long as the threshold value SAD_100 is simply set and at least SAD(6) ≤SAD_100 is satisfied, the possibility of the presence of flicker at 100 Hz can be detected. Here, since the luminance is constant in an environment where no flicker exists, AE(1)≈AE(2)≈ ... ≈ AE(12) and SAD(6)≈0 as well. Accordingly, in order to detect the presence of flicker, SAD(3) is also calculated. SAD(3) has a value obtained by calculating the similarity between the nth photometric value and a photometric value after 1.66×3≈5 ms has elapsed. In an environment of flicker at 100 Hz, a photometric value at a timing shifted by 5 ms has a relationship with a completely opposite phase to the flicker period. Therefore, SAD(3) has a value much larger than SAD(6).

Figure 9A:
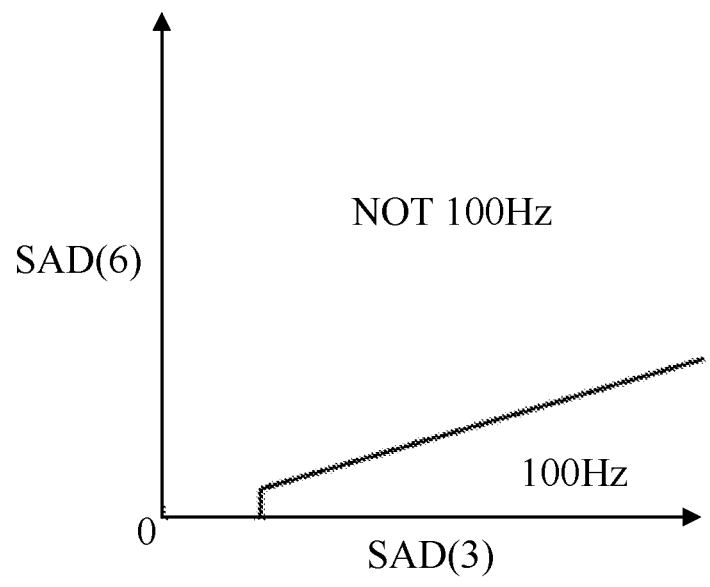
FIGS. 9A and 9B illustrate flicker determination according to the embodiment.

FIG. 9A illustrates a boundary for determining the presence or absence of flicker in a case where a horizontal axis is SAD (3) obtained using 12 photometric values obtained from 12 flicker detecting images and a vertical axis is SAD (6). In this embodiment, if SAD(3) and SAD(6) are within an area below the boundary, it is determined that flicker at 100 Hz exists.

After the determination of flicker at 100 Hz is thus completed, the flicker detector 130 next determines flicker at 120 Hz. In an environment of flicker at 120 Hz, the flicker period is about 8.333 ms, so AE(n)≈AE(n+5) and SAD(5)≈0 are established. In addition, in the case of flicker at 120 Hz, the relationship with the completely opposite phase occurs after 4.16 ms has elapsed, so it is ideal to calculate the similarity between the nth photometric value and a photometric value after 4.16 ms has passed. However, since 4.16 ms is not an integral multiple of the accumulation time of 1.66 ms for generating a flicker detecting image, the value of SAD (3) is substituted, which represents the similarly to the photometric value after 5 ms has passed. Even in an environment of flicker at 120 Hz, SAD(3) illustrates the similarity between photometric values at an interval close to an opposite phase, so SAD(3) has a value much larger than that of SAD(5).

Figure 8B:
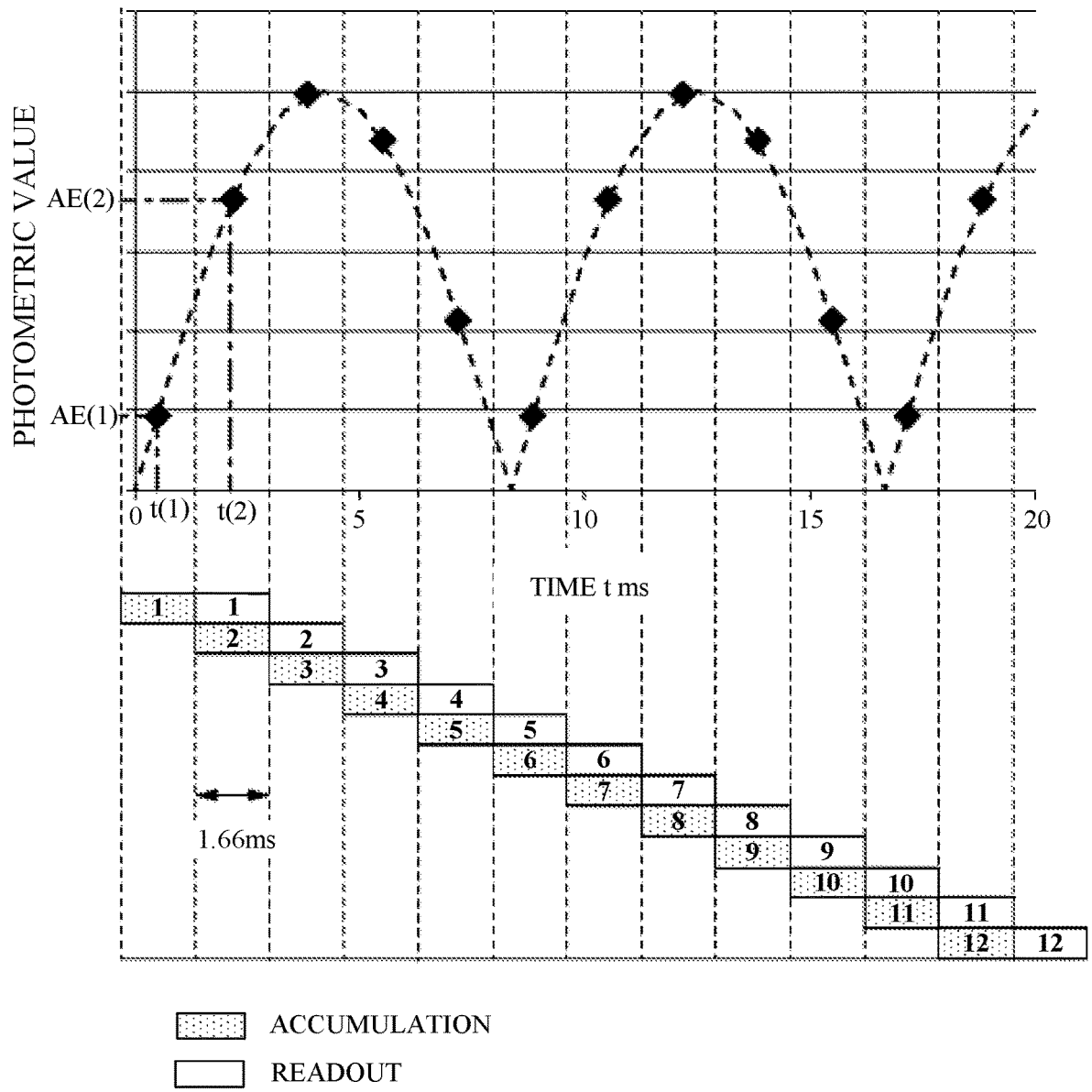
Figure 9B:
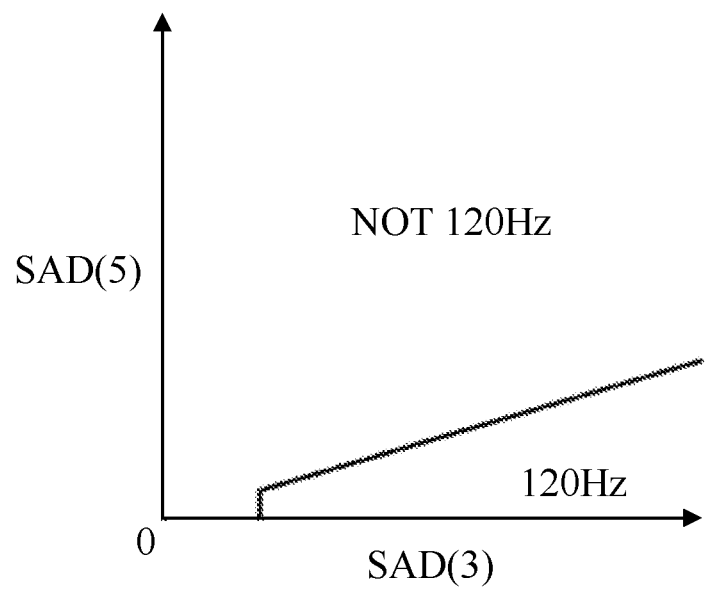

FIG. 8B illustrates accumulation control of the image sensor 122 and changes in photometric values in an environment where flicker at 120 Hz occurs in a 60 Hz commercial power supply. FIG. 9B illustrates a boundary for determining the presence or absence of flicker in a case where flicker at 120 Hz exists, the horizontal axis represents SAD(3) obtained using 12 photometric values obtained from 12 flicker detecting images, and the vertical axis represents SAD(5). In this embodiment, if SAD(3) and SAD(5) are within an area below the boundary, it is determined that flicker at 120 Hz exists.

The boundaries illustrated in FIGS. 9A and 9B are merely illustrative, and the slopes and bending points may be different from those in FIGS. 9A and 9B.

A description will now be given of two types of readout modes in this embodiment. As illustrated in FIG. 7, for flicker detection, the flicker detecting signal readout is necessary in addition to the LV signal readout. The defocus amount is calculated using a signal that is read out to generate the LV image. At this time, if the LV signal readout is performed in a row that is thinned out from a row in which the flicker detecting signal readout is performed, the vertical defocus calculation cannot calculate a phase difference between a pair of focus detecting signals generated from a signal from a thinned-out row, the focus detecting performance may deteriorate.

Thus, this embodiment provides a vertical priority readout mode (first readout state) as a first readout mode for performing LV signal readout from all rows (first and second pixels) without row thinning out from the image sensor 122. This embodiment further provides a horizontal readout mode (second readout state) for performing the focus detecting signal readout from a row including only the first pixel while giving priority to the flicker detecting signal readout over the LV (focus detecting) signal readout. In the horizontal readout mode, the flicker detecting signal readout is performed from the thinned-out row including the first and second pixels. Then, the vertical priority readout mode and the horizontal readout mode are switched at a predetermined cycle during AF.

Figure 10:
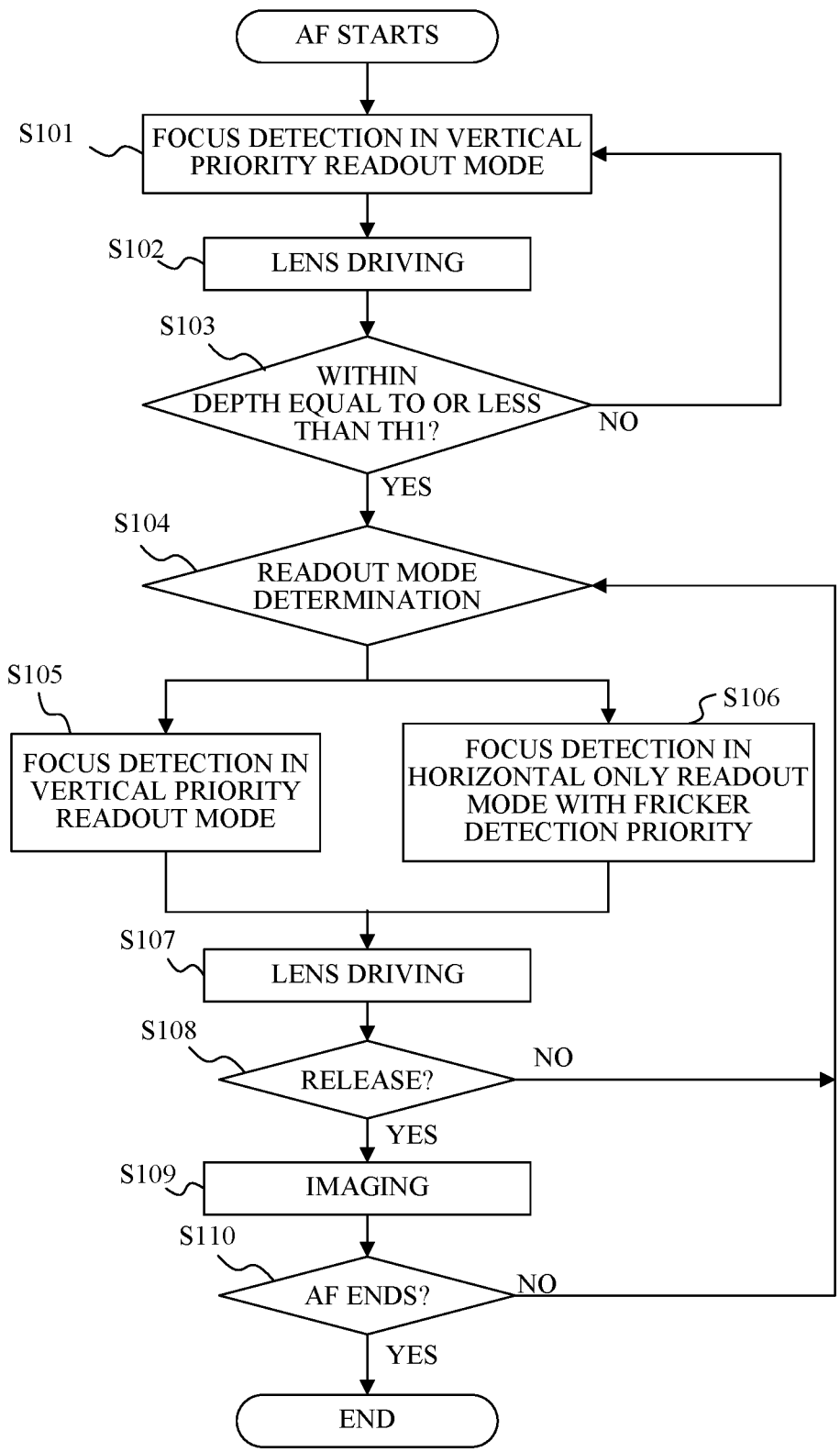
FIG. 10 illustrates imaging processing according to the embodiment.

A flowchart in FIG. 10 illustrates imaging processing (detecting method) performed by the camera MPU 125 according to a program.

In step S101, the camera MPU 125, which starts AF when the user operates the imaging preparation switch, sets the vertical priority readout mode, and causes the phase-difference AF unit 129 to perform focus detection. In focus detection, the camera MPU 125 selects, as a defocus amount to be used for AF, one of the defocus amounts obtained in the vertical and horizontal defocus calculations, which is more reliable. The reliability here is calculated based on the contrast, degree of coincidence, etc. of the pair of focus detecting signals.

Next, in step S102, the camera MPU 125 calculates a focus driving amount based on the defocus amount obtained in step S101, and sends a focus command to the lens MPU 117 to drive the focus lens 104.

Next, in step S103, the camera MPU 125 causes the phase-difference AF unit 129 to perform focus detection again after driving the focus lens 104, and determines whether the calculated defocus amount is within a depth equal to or less than a threshold TH1. In a case where the calculated defocus amount is not within the depth equal to or less than the threshold TH1, the flow returns to step S101, and in a case where the calculated defocus amount is not within the depth equal to or less than the threshold TH1, the flow proceeds to step S104.

Figure 11:
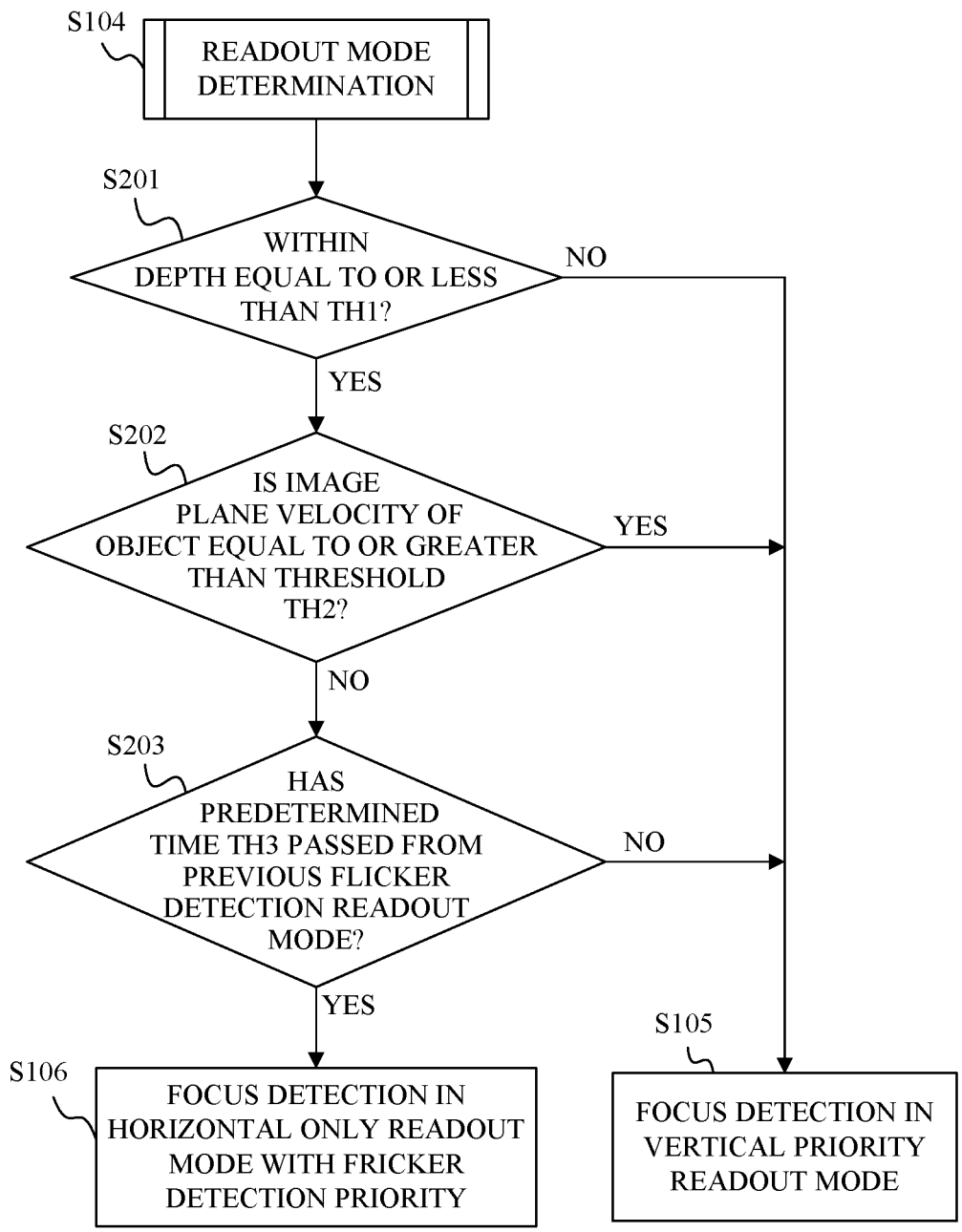
FIG. 11 illustrates readout mode setting processing according to the embodiment.

In step S104, the camera MPU 125 determines (sets) the readout mode. The processing in step S104 will be explained using the flowchart of FIG. 11.

In step S201, the camera MPU 125 determines whether the defocus amount obtained by the previous focus detection is within the depth equal to or less than the threshold TH1. That is, the vertical priority readout mode is maintained until the defocus amount falls within a predetermined range (within the depth equal to or less than the threshold TH1) after AF is started. In a case where the defocus amount is within the depth equal to or less than the threshold TH1, the flow proceeds to step S105, and in a case where the defocus amount is within the depth equal to or less than the threshold TH1, the flow proceeds to step S202. The threshold TH1 in step S201 may be the same as or different from the threshold TH1 in step S103.

In step S202, the camera MPU 125 determines whether the image plane velocity of the object (moving speed of the object image plane) is equal to or greater than a threshold TH2 as a predetermined value. The image plane velocity of the object is calculated from a change amount in the value (image plane position) that is the sum of the defocus amount and the value obtained by converting the focus position at the focus detection timing into the image plane. The change amount in the image plane position can be calculated by storing history information of the image plane position in the RAM 125b. In a case where the image plane velocity of the object is equal to or greater than the threshold TH2, the flow proceeds to step S105, and in a case where it is less than the threshold TH2, the flow proceeds to step S203.

In step S203, the camera MPU 125 determines whether a predetermined time TH3 has elapsed since the previous flicker detection priority readout mode (horizontal readout mode) was set. In a case where the predetermined time TH3 has not elapsed, the flow proceeds to step S105, and in a case where the predetermined time TH3 has elapsed, the flow proceeds to step S106. The predetermined time TH3 is set based on the time required for the flicker detecting signal readout a plurality of times in one set readout.

In FIG. 10, in step S105, the camera MPU 125 sets the vertical priority readout mode similarly to step S101, and causes the phase-difference AF unit 129 to perform focus detection.

On the other hand, in step S106, the camera MPU 125 sets the horizontal readout mode and causes the phase-difference AF unit 129 to perform focus detection. At this time, the camera MPU 125 causes the flicker detector 130 to perform horizontal flicker detection, and causes the phase-difference AF unit 129 to perform horizontal defocus calculation. In a case where the reliability of the current defocus amount (first defocus amount) obtained by horizontal defocus calculation is lower than a predetermined value, the current defocus amount may be supplemented (corrected) based on the defocus amount obtained from the previous focus detection (second defocus amount).

In step S107 following step S105 or S106, the camera MPU 125 causes the lens MPU 117 to drive the focus lens 104 based on the defocus amount obtained in step S105 or S106.

Next, in step S108, the camera MPU 125 determines whether or not the release switch has been operated. In a case where the release switch has not been operated, the flow returns to step S104, and in a case where the release switch has been operated, the flow proceeds to step S109.

In step S109, the camera MPU 125 performs imaging to obtain an image for recording.

In step S110, the camera MPU 125 determines whether to end AF (the imaging preparation switch is not operated). In a case where AF is not to be terminated, the flow returns to step S104, and in a case where AF is to be terminated, the flow ends.

This embodiment can detect flicker, and perform focus detection (and AF) with excellent accuracy in an environment where flicker exists, and even in an environment where flicker dynamically changes.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This embodiment can perform flicker detection and focus detection with excellent accuracy.

This application claims the benefit of Japanese Patent Application No. 2022-198762, filed on Dec. 13, 2022, which is hereby incorporated by reference herein in its entirety.

What is claimed is:

1. A detecting apparatus comprising:
a memory storing instructions; and
a processor configured to execute the instructions to:
perform focus detection using a pair of focus detecting signals obtained from an image sensor that has a first pixel including a pair of photoelectric converters arranged in a first direction and a second pixel including a pair of photoelectric converters arranged in a second direction different from the first direction,
detect flicker using a flicker detecting signal obtained from the image sensor, and
control signal readout from the image sensor,
wherein the processor is configured to switch between a first readout state for performing signal readout for generating the pair of focus detecting signals from each of the first pixel and the second pixel, and a second readout state for performing signal readout for generating the pair of focus detecting signals from a focus detecting pixel as the first pixel and for performing signal readout for generating the flicker detecting signal from a flicker detecting pixel that is either the first pixel or the second pixel and is different from the focus detecting pixel.

2. The detecting apparatus according to claim 1, wherein in the second readout state, the processor is configured to:
perform signal readout for generating the focus detecting signal from a row that includes only the first pixel among a plurality of rows each including a plurality of pixels in the image sensor, and
perform signal readout for generating the flicker detecting signal from a row including the first pixel and the second pixel.

3. The detecting apparatus according to claim 1, wherein the processor is configured to repeat signal readout including switching between the first readout state and the second readout state at a predetermined period.

4. The detecting apparatus according to claim 1, wherein the processor is configured to perform signal readout a plurality of times for generating the flicker detecting signal in the second readout state per single signal readout in the first readout state.

5. The detecting apparatus according to claim 1, wherein the processor is configured to set the second readout state in a case where a defocus amount obtained by the focus detection in the first readout state falls within a predetermined range.

6. The detecting apparatus according to claim 1, wherein the processor is configured to switch from the first readout state to the second readout state in a case where a moving speed of an object image plane is higher than a predetermined value.

7. The detecting apparatus according to claim 1, wherein in a case where focus control is performed based on a defocus amount obtained by the focus detection, the processor is configured to maintain the first readout state from when the focus control is started to when the defocus amount falls within a predetermined range.

8. The detecting apparatus according to claim 1, wherein the processor is configured to correct a first defocus amount using a second defocus amount obtained before the first defocus amount in a case where reliability of the first defocus amount obtained by performing signal readout from the focus detecting pixel in the second readout state is lower than a predetermined value.

9. The detecting apparatus according to claim 1, wherein the first direction is a long side direction of the image sensor, and the second direction is a short side direction of the image sensor.

10. An image pickup apparatus comprising:
the detecting apparatus according to claim 1; and
the image sensor,
wherein the image pickup apparatus performs focus control based on a defocus amount obtained by the focus detection.

11. A detecting method comprising the steps of:
performing focus detection using a pair of focus detecting signals obtained from an image sensor that has a first pixel including a pair of photoelectric converters arranged in a first direction and a second pixel including a pair of photoelectric converters arranged in a second direction different from the first direction,
detecting flicker using a flicker detecting signal obtained from the image sensor, and
controlling signal readout from the image sensor,
wherein the controlling step switches between a first readout state for performing signal readout for generating the pair of focus detecting signals from each of the first pixel and the second pixel, and a second readout state for performing signal readout for generating the pair of focus detecting signals from a focus detecting pixel as the first pixel and for performing signal readout for generating the flicker detecting signal from a flicker detecting pixel that is either the first pixel or the second pixel and is different from the focus detecting pixel.

12. A non-transitory computer-readable storage medium storing a program that causes a computer to perform the detecting method according to claim 11.

* * * * *